US010295219B2

(12) United States Patent
Kitagishi

(10) Patent No.: US 10,295,219 B2
(45) Date of Patent: May 21, 2019

(54) AIR CONDITIONING CASE POSITIONING PIN AND HOLDING PIECE THAT ENGAGE AN ATTACHMENT PART PROJECTION PIECE

(71) Applicant: DENSO CORPORATION, Kariya, Aichi-pref. (JP)

(72) Inventor: Seiichirou Kitagishi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 341 days.

(21) Appl. No.: 15/125,032

(22) PCT Filed: Mar. 19, 2015

(86) PCT No.: PCT/JP2015/001530
§ 371 (c)(1),
(2) Date: Sep. 9, 2016

(87) PCT Pub. No.: WO2015/146087
PCT Pub. Date: Oct. 1, 2015

(65) Prior Publication Data
US 2017/0016647 A1  Jan. 19, 2017

(30) Foreign Application Priority Data

Mar. 24, 2014  (JP) .................................. 2014-060125

(51) Int. Cl.
*B60H 1/00* (2006.01)
*F24F 13/20* (2006.01)
(Continued)

(52) U.S. Cl.
CPC .......... *F24F 13/20* (2013.01); *B60H 1/00521* (2013.01); *F24F 13/24* (2013.01); *F24F 2013/1433* (2013.01)

(58) Field of Classification Search
CPC ............................... F16B 21/06; F16B 21/065
See application file for complete search history.

(56) References Cited

U.S. PATENT DOCUMENTS 4,672,732 A * 6/1987 Ramspacher ............. F16B 5/02
29/429
6,351,380 B1 * 2/2002 Curlee .................... F16B 5/065
165/80.3
(Continued)

FOREIGN PATENT DOCUMENTS

DE        10011236 A1 *  9/2001 ......... B60H 1/00521
DE     102009039406 A1    3/2011
WO    WO 2017215974 A1 * 12/2017 ......... B60H 1/00521

*Primary Examiner* — Gregory L Huson
*Assistant Examiner* — Frances F. Hamilton
(74) *Attorney, Agent, or Firm* — Harness, Dickey & Pierce, P.L.C.

(57) ABSTRACT

An air-conditioning apparatus includes: an air-conditioning case that includes an air passage through which air-conditioned wind flows and that is molded using a die; and an attachment part that is fixed on an outer surface of the air-conditioning case and includes a plate-shaped projection piece, which projects from a case main body part of the attachment part and includes a positioning hole passing through the projection piece. The air-conditioning case includes: a holding piece that projects from the outer surface to be engaged with the projection piece; and a positioning pin that projects from the outer surface to be inserted in the positioning hole. The holding piece includes: a leg part that projects from the outer surface and is capable of being resiliently deformed; and an engagement part that is bent and extends from an end portion of the leg part and that is engaged with a part of the projection piece on its end side of the positioning hole. When viewed along a projection direction of the projection piece, the leg part is located at a position that does not overlap with the positioning pin.

5 Claims, 4 Drawing Sheets

(51) Int. Cl.
*F24F 13/24* (2006.01)
*F24F 13/14* (2006.01)

(56) References Cited

U.S. PATENT DOCUMENTS

| | | | |
|---|---|---|---|
| 7,384,210 B2* | 6/2008 | Sura | F16B 5/065 |
| | | | 403/168 |
| 7,411,788 B2* | 8/2008 | Liang | H05K 7/20172 |
| | | | 361/694 |
| 8,020,902 B1* | 9/2011 | Li | E05C 19/06 |
| | | | 292/303 |
| 9,206,830 B2* | 12/2015 | Lu | F16B 19/004 |
| 9,534,620 B2* | 1/2017 | Courtin | F16B 5/065 |
| 2002/0041484 A1* | 4/2002 | Lajara | G06F 1/181 |
| | | | 361/679.48 |
| 2004/0257786 A1* | 12/2004 | Murasawa | H01L 23/4006 |
| | | | 361/810 |
| 2012/0027511 A1* | 2/2012 | Wei | H05K 5/0013 |
| | | | 403/381 |
| 2017/0129308 A1* | 5/2017 | Vincent | B60H 1/00521 |

* cited by examiner

AIR CONDITIONING CASE POSITIONING PIN AND HOLDING PIECE THAT ENGAGE AN ATTACHMENT PART PROJECTION PIECE

CROSS REFERENCE TO RELATED APPLICATIONS

This application is a U.S. National Phase Application under 35 U.S.C. 371 of International Application No. PCT/JP2015/001530 filed on Mar. 19, 2015 and published in Japanese as WO 2015/146087 A1 on Oct. 1, 2015. This application is based on and claims the benefit of priority from Japanese Patent Application No. 2014-060125 filed on Mar. 24, 2014. The entire disclosures of all of the above applications are incorporated herein by reference.

TECHNICAL FIELD

The present disclosure relates to an air-conditioning apparatus that air-conditions a room interior.

BACKGROUND ART

There is conventionally an apparatus described in, for example, Patent Document 1 for this type of air-conditioning apparatus. According to this air-conditioning apparatus described in Patent Document 1, an attachment part is fixed on the outer surface of an air-conditioning case by snap-fitting.

Specifically, a plate-shaped projection piece having a positioning hole is provided for the attachment part. A hook-shaped holding piece and a positioning pin that is inserted in the positioning hole are provided for the air-conditioning case. The holding piece includes a leg part that projects from the outer surface of the air-conditioning case, and an engagement part that is bent and extends from the end portion of the leg part to be engaged with the projection piece. The sectional shape of the leg part has a circular arc shape.

The positioning pin is inserted into the positioning hole, and the projection piece is clamped between the seating surface and the engagement part of the air-conditioning case. Consequently, the attachment part is fixed to the air-conditioning case.

PRIOR ART DOCUMENT

Patent Document

Patent Document 1: DE 102009039406 A1

However, in the conventional air-conditioning apparatus, the surface of the leg part that is opposed to the positioning pin and the surface of the engagement part that is engaged with the projection piece become undercut parts when the air-conditioning case is molded using a molding die. Besides, the sectional shape of the leg part has a circular arc shape. Thus, the surface serving as a undercut part cannot be molded using a slide core.

Therefore, the surface serving as a undercut part is molded by a molding die with which to mold the inner surface of the air-conditioning case, and a die release hole is formed at the air-conditioning case. Consequently, the air-conditioned wind leaks to the outside from this die release hole, thus raising issues such as deterioration in air-conditioning performance and generation of wind leaking noise.

SUMMARY OF INVENTION

The present disclosure addresses the above issues. Thus, it is an objective of the present disclosure to prevent a wind leakage from a die release hole.

To achieve the objective, an air-conditioning apparatus in an aspect of the present disclosure includes: an air-conditioning case that includes an air passage through which air-conditioned wind flows and that is molded using a die; and an attachment part that is fixed on an outer surface of the air-conditioning case and includes a plate-shaped projection piece, which projects from a case main body part of the attachment part and includes a positioning hole passing through the projection piece. The air-conditioning case includes: a holding piece that projects from the outer surface to be engaged with the projection piece; and a positioning pin that projects from the outer surface to be inserted in the positioning hole. The holding piece includes: a leg part that projects from the outer surface and is capable of being resiliently deformed; and an engagement part that is bent and extends from an end portion of the leg part and that is engaged with a part of the projection piece on its end side of the positioning hole. When viewed along a projection direction of the projection piece, the leg part is located at a position that does not overlap with the positioning pin.

As a consequence of this aspect, the undercut parts are the surface of the engagement part that is engaged with the projection piece (referred to as an engagement part engagement surface), and the surface of the leg part that is continuous with the engagement part engagement surface. When viewed along the projection direction of the projection piece, the leg part is located at the position that does not overlap with the positioning pin. Thus, the undercut parts can be molded by moving the slide core in the projection direction of the projection piece. Therefore, the die release hole of the air-conditioning case can be eliminated to prevent a wind leakage.

BRIEF DESCRIPTION OF DRAWINGS

The above and other objects, features and advantages of the present disclosure will become more apparent from the following detailed description made with reference to the accompanying drawings. In the drawings.

EMBODIMENT FOR CARRYING OUT INVENTION

An embodiment will be described below with reference to the accompanying drawings.

Figure 1:
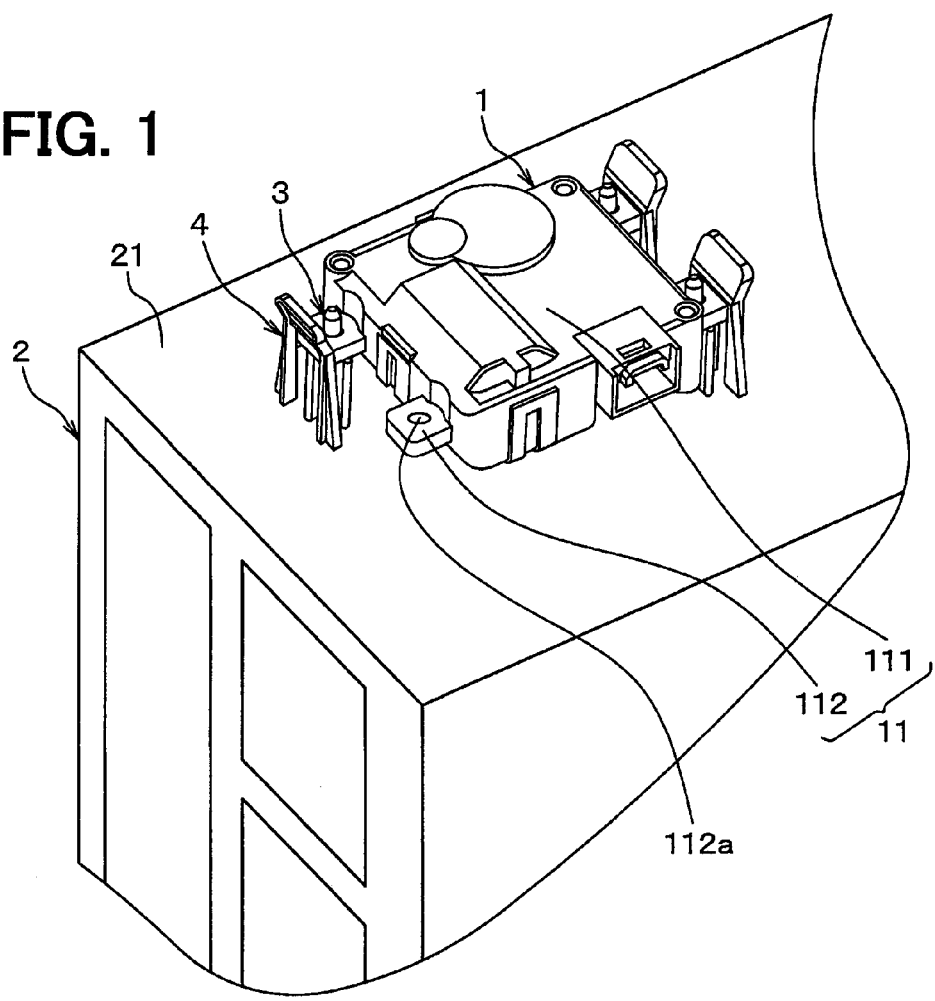
FIG. 1 is a perspective view illustrating a main part of an air-conditioning apparatus in accordance with an embodiment.
Figure 2:
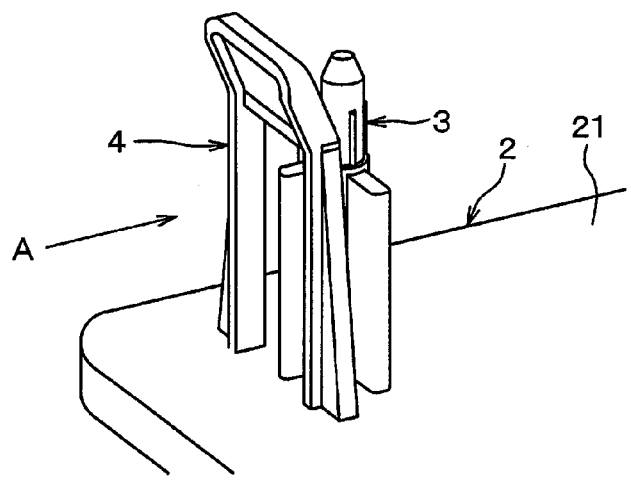
FIG. 2 is a perspective view illustrating a main part of an air-conditioning case in FIG. 1.
Figure 3:
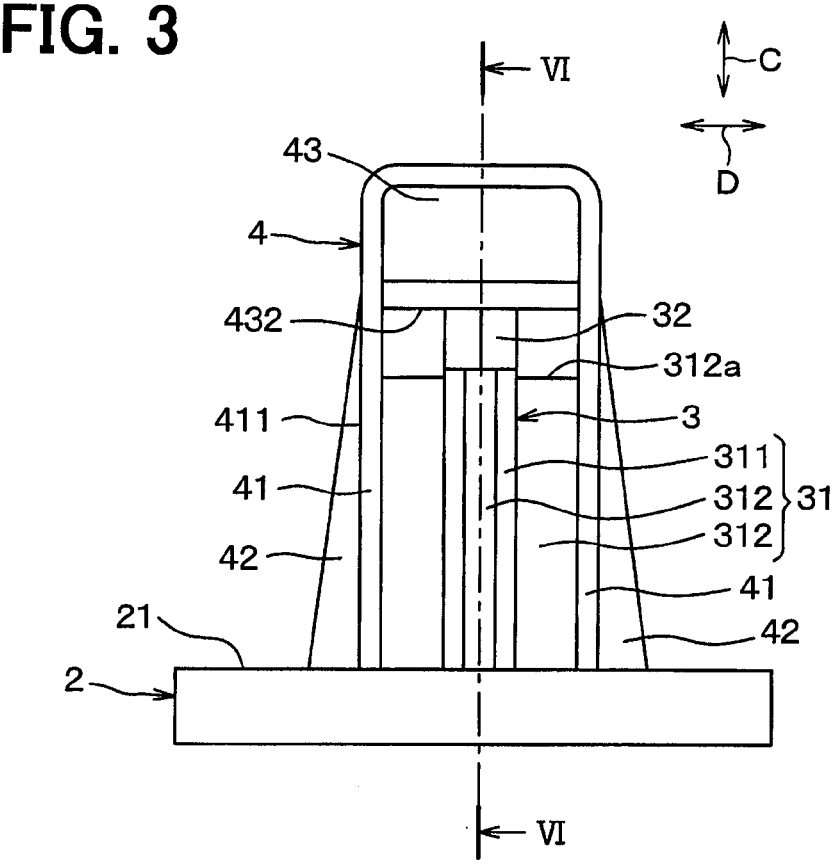
FIG. 3 is a diagram viewed from an arrow A in FIG. 2.
Figure 4:
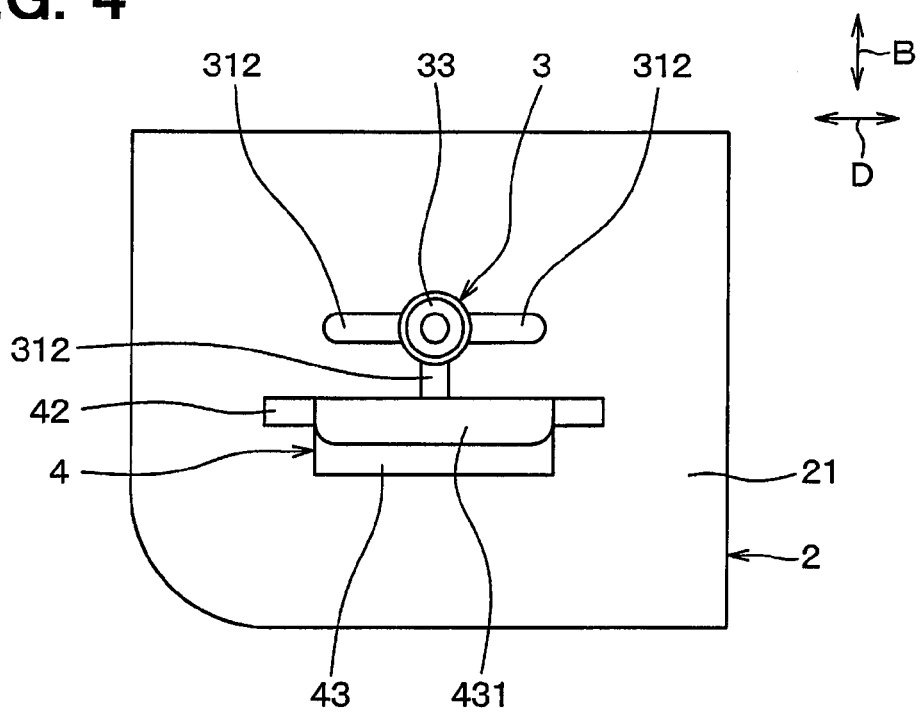
FIG. 4 is a plan view illustrating the case in FIG. 3.
Figure 5:
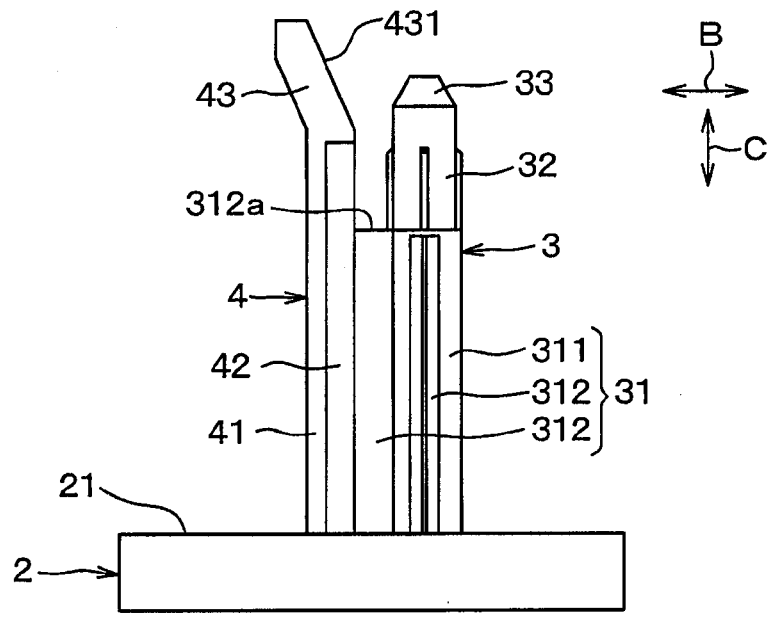
FIG. 5 is a right side view of the case in FIG. 3.

As illustrated in FIG. 1, an air-conditioning apparatus that air-conditions a vehicle interior includes a resin air-conditioning case 2 that is molded using a die. Although only a part of the air-conditioning case 2 is illustrated in FIG. 1, the air-conditioning case 2 has a box shape, and in the case 2, an air passage through which air-conditioned wind flows is provided, and for example, the components (e.g., evaporator and heater core: not shown) of a refrigeration cycle, and the air outlet door (not shown) that opens or closes an air outlet for air-conditioned wind are accommodated.

A servomotor 1 serving as an attachment part that drives the air outlet door is fixed on an outer surface 21 of the air-conditioning case 2.

The servomotor 1 includes a case 11 made of resin. The case 11 includes a box-shaped case main body part 111 and plate-shaped projection pieces 112. For example, an electric motor (not shown) is accommodated in the case main body part 111. The projection piece 112 projects from the case main body part 111, and includes a circular positioning hole 112a passing through the piece 112.

As illustrated in FIGS. 1 to 6, positioning pins 3 that project from the outer surface 21 to be inserted in the respective positioning holes 112a, and holding pieces 4 that project from the outer surface 21 to be engaged with the respective projection pieces 112 are formed at the air-conditioning case 2.

The positioning pin 3 includes a pin proximal part 31 from a proximal end to an intermediate portion of the positioning pin 3, a pin positioning part 32 that is located on a positioning pin distal end side of the pin proximal part 31, and a pin guide part 33 that is located further on a positioning pin distal end side of the pin positioning part 32.

The pin proximal part 31 includes a proximal part cylindrical portion 311 having a circular cylinder shape that extends from the proximal end to the intermediate portion of the positioning pin 3, and three plate-shaped proximal part plate portions 312 that project radially outward from the outer peripheral surface of the proximal part cylindrical portion 311. The projection piece 112 is brought into contact with a pin seating surface 312a, which is the end surface of the proximal part plate portion 312 on a positioning pin distal end side.

The pin positioning part 32 is formed in a circular cylinder shape, and is fitted into the positioning hole 112a.

The pin guide part 33 has a conical shape that becomes narrower toward the positioning pin distal end. The pin guide part 33 is located at a position that overlaps with an engagement part 43 (described later) when viewed along a projection piece projection direction B (direction perpendicular to the plane of paper in FIG. 3; also right-left direction on the plane of paper in FIG. 6) which is a projection direction of the projection piece 112. When the servomotor 1 is attached to the air-conditioning case 2, the pin guide part 33 guides the positioning hole 112a to the pin positioning part 32.

The holding piece 4 is located at a position that is farther away from the servomotor 1 than the positioning pin 3. In other words, the positioning pin 3 is located between the holding piece 4 and the servomotor 1.

The holding piece 4 includes two leg parts 41 that project from the outer surface 21 and that can be resiliently deformed, a rib 42 that projects from each of the leg parts 41, and the engagement part 43 that is bent and extends from the end portion of the leg part 41 and that is engaged with the part of the projection piece 112 on a projection piece end side of the positioning hole 112a. In other words, the end portions of the two leg parts 41 are connected together by the engagement part 43, and the holding piece 4 thereby has a gate shape.

The projection direction of the positioning pin 3 (upper-lower direction on the plane of paper in FIGS. 3 and 5) is referred to as a positioning pin projection direction C. The direction perpendicular both to the projection piece projection direction B and to the positioning pin projection direction C (right-left direction on the plane of paper in FIG. 3) is referred to as an engagement part direction D.

The leg part 41 is located at a position that is shifted from the positioning pin 3 in the engagement part direction D. In other words, the leg parts 41 are arranged at positions that do not overlap with the positioning pin 3 when viewed along the projection piece projection direction B.

When viewed along the projection piece projection direction B, the rib 42 projects from a leg part first surface 411 of the surfaces of the leg part 41 that is located on its opposite side from the positioning pin 3.

The engagement part 43 is inclined relative to the positioning pin projection direction C. Thus, a guide surface 431 of the engagement part 43 on the positioning pin 3-side is also inclined relative to the positioning pin projection direction C. More specifically, the guide surface 431 is inclined to gradually approach the positioning pin 3 along a motor attachment direction E (downward direction on the plane of paper in FIG. 6) which is an attachment direction when the servomotor 1 is attached to the air-conditioning case 2. When the servomotor 1 is attached to the air-conditioning case 2, the end of the projection piece 112 slides on the guide surface 431.

An engagement surface 432 which is an end surface of the engagement part 43 in the motor attachment direction E is engaged with the part of the projection piece 112 on its end side of the positioning hole 112a. The engagement surface 432 is opposed to one of the three pin seating surfaces 312a.

Molding of the air-conditioning case 2 will be described below.

Figure 6:
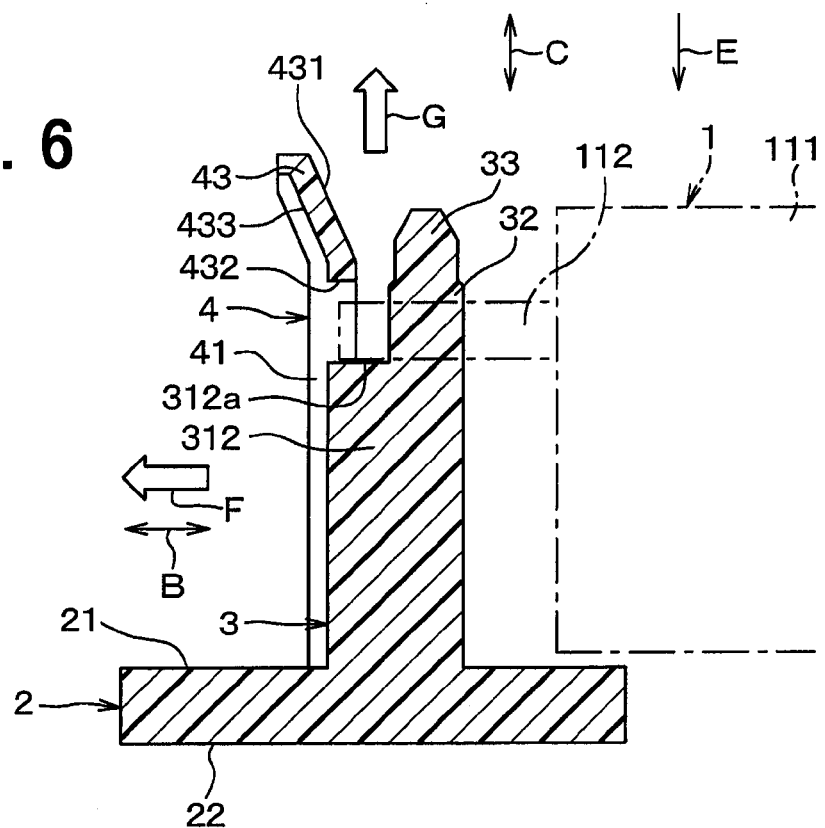
FIG. 6 is a sectional view taken along a line VI-VI in FIG. 3.
Figure 7:
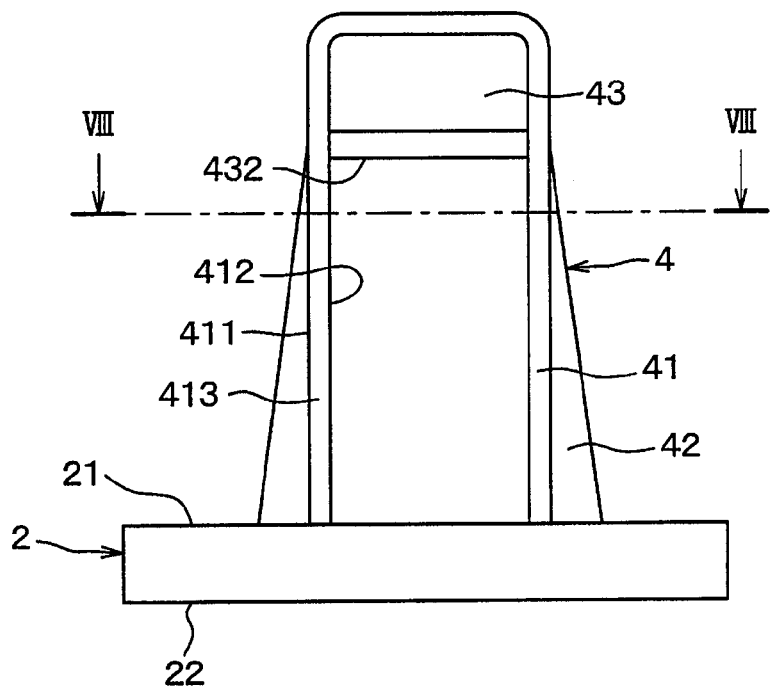
FIG. 7 is a diagram illustrating a holding piece in FIG. 3.
Figure 8:
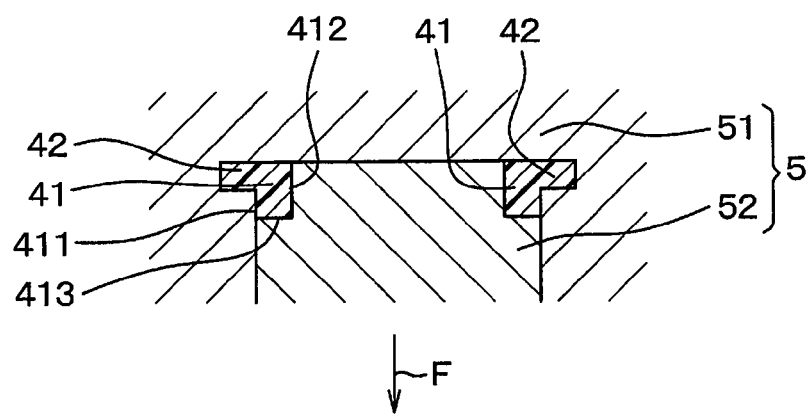
FIG. 8 is a diagram illustrating a shape of a cross-section taken along a line VIII-VIII in FIG. 7 together with a molding die.

As illustrated in FIGS. 6 to 8, a molding die 5 of the air-conditioning case 2 includes an upper die 51 and a slide core 52 that mold the outer surface 21-side, and furthermore a lower die (not shown) that molds an inner surface 22-side of the air-conditioning case 2.

The undercut parts are the proximal part plate portion 312 of the three plate-shaped proximal part plate portions 312 that includes the pin seating surface 312a opposed to the engagement surface 432, a leg part second surface 412 of the leg part 41 that is located on its opposite side from the rib 42, a leg part third surface 413 of the leg part 41 that is located on its opposite side from the positioning pin 3, an engagement part reverse surface 433 of the engagement part 43 that is located on its opposite side from the guide surface 431, and the engagement surface 432.

These undercut parts are formed by the slide core 52. Specifically, when viewed along the projection piece projection direction B, the leg part 41 is located at a position that does not overlap with the positioning pin 3. Thus, the undercut parts can be molded by moving the slide core 52 in the projection piece projection direction B. Consequently, a die release hole of the air-conditioning case 2 can be eliminated.

After molding the air-conditioning case 2, the slide core 52 is moved along a core die release direction F (leftward on the plane of paper in FIG. 6 as well as downward on the plane of paper in FIG. 8) which is a die release direction of the slide core 52. The core die release direction F is parallel to the projection piece projection direction B.

Those of the surfaces of the leg part 41 which exclude the leg part second surface 412 and the leg part third surface 413 are molded by the upper die 51. After molding the air-conditioning case 2, the upper die 51 is moved along an upper die release direction G (upward on the plane of paper in FIG. 6) which is a die release direction of the upper die 51. The upper die release direction G is parallel to the positioning pin projection direction C.

After molding the air-conditioning case 2, firstly from among the upper die 51 and the slide core 52, the slide core 52 is moved along the core die release direction F. In this case, the holding piece 4 is pulled in the core die release direction F to be deformed due to the adhesion of the contact part between the slide core 52 and the holding piece 4. However, since the ribs 42 are being held by the upper die 51, the deformation of the holding piece 4 is prevented.

The attachment of the servomotor 1 to the air-conditioning case 2 will be described below.

The pin guide part 33 is first inserted into the positioning hole 112a of the projection piece 112, and the servomotor 1 is moved to fit the pin positioning part 32 into the positioning hole 112a. In this case, the servomotor 1 can be guided by pin guide part 33 having a conical shape to smoothly move to a predetermined position.

At the time of insertion of the pin guide part 33 into the positioning hole 112a, the end of the projection piece 112 is in contact with the guide surface 431. When the servomotor 1 is moved further from this state, the servomotor 1 proceeds with the end of the projection piece 112 sliding on the inclined guide surface 431 and the projection piece 112 pushing the engagement part 43 to resiliently deform the leg parts 41 (i.e., to bend the holding piece 4).

When the servomotor 1 is moved to a position where the projection piece 112 is brought into contact with the pin seating surface 312a as illustrated in FIG. 6, the leg part 41 recovers to its original shape by restoring force (i.e., deflection of the holding piece 4 is removed), and the projection piece 112 is engaged with the engagement surface 432. This completes the attachment of the servomotor 1 to the air-conditioning case 2.

In the present embodiment, the undercut part is molded by the slide core 52 as described above, and thus the die release hole of the air-conditioning case 2 can be eliminated to prevent a wind leakage.

The slide core 52 is die-released with the ribs 42 being held by the upper die 51, and thus the deformation of the holding piece 4 at the time of the die-release of the slide core 52 can be prevented.

By inclining the guide surface 431, the end of the projection piece 112 is in contact with the guide surface 431 at the time of the attachment of the servomotor 1 to the air-conditioning case 2. Thus, the attachability improves without shoulders at the time of the attachment.

Since the pin guide part 33 having a conical shape is provided, the servomotor 1 can smoothly be guided to the position where the pin positioning part 32 is fitted into the positioning hole 112a.

In the above embodiment, the end portions of the two leg parts 41 are connected together by the engagement part 43. Alternatively, the engagement part 43 may be divided at its middle portion. In other words, the end portions of the two leg parts 41 do not need to be connected together.

In the above embodiment, the holding piece 4 includes the two leg parts 41, but there may be a single leg part 41.

The present disclosure is not limited to the above-described embodiment and can be modified appropriately within the scope recited in CLAIMS. Modifications to the above embodiment will be described below.

Needless to say, in the above embodiment, the components constituting the embodiment are not necessarily essential except in the case where they are clearly specified as particularly essential or considered to be obviously essential in principle, for example.

In the above embodiment, if the numerical values of the number of components, the numerical values, the amounts, the ranges or the like of the embodiment are mentioned, they are not limited to particular numbers except in the case where they are clearly specified as particularly essential or are obviously limited to the particular numbers in principle, for example.

In the above embodiment, when, for example, the shapes, the positional relationships of the components or the like are mentioned, they are not limited to these particular shapes, positional relationships or the like except in the case where they are particularly specified clearly or are limited to the particular shapes, positional relationships or the like in principle, for example.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An air-conditioning apparatus comprising:
an air-conditioning case that includes an air passage through which air-conditioned wind flows and that is molded using a die; and
an attachment part that is fixed on an outer surface of the air-conditioning case and includes a plate-shaped projection piece, which projects in a direction away from a case main body part of the attachment part and includes a positioning hole passing through the projection piece, wherein:
the air-conditioning case includes:
a holding piece that projects from the outer surface to be engaged with the projection piece; and
a positioning pin that projects from the outer surface to be inserted in the positioning hole;
the holding piece includes:
a leg part that projects from the outer surface and is capable of being resiliently deformed; and
an engagement part that is bent and extends from an end portion of the leg part and that is to be engaged with a part of the projection piece on its end side of the positioning hole; and
when viewed along the projection direction of the projection piece, the leg part is located at a position that does not overlap with the positioning pin.

2. The air-conditioning apparatus according to claim 1, wherein a guide surface of the engagement part on the positioning pin-side is inclined relative to a projection direction of the positioning pin, such that the attachment part is attached to the air-conditioning case with an end of the projection piece sliding on the guide surface.

3. The air-conditioning apparatus according to claim 1, wherein a distal end side of the positioning pin has a conical shape that becomes narrower toward a distal end of the positioning pin.

4. The air-conditioning apparatus according to claim 1, wherein:
the holding piece includes a rib that projects from the leg part; and when viewed along the projection direction of the projection piece, the rib projects from a surface of surfaces of the leg part that is located on an opposite side of the leg part from the positioning pin.

5. The air-conditioning apparatus according to claim 1, wherein:
the leg part is one of two leg parts;
the holding piece includes the two leg parts; and
end portions of the two leg parts are connected together by the engagement part.

* * * * *